(12) United States Patent
Woodrum

(10) Patent No.: US 6,289,349 B1
(45) Date of Patent: Sep. 11, 2001

(54) BINARY TREE STRUCTURE WITH END OF PATH FLAGS STORED WITH PATH ARC'S

(76) Inventor: Luther J. Woodrum, P.O. Box 1847, Poughkeepsie, NY (US) 12601

( * ) Notice: Subject to any disclaimer, the term of this patent is extended or adjusted under 35 U.S.C. 154(b) by 0 days.

(21) Appl. No.: 08/767,042

(22) Filed: Dec. 12, 1996

Related U.S. Application Data

(62) Division of application No. 07/970,399, filed on Nov. 2, 1992, now Pat. No. 5,628,002.

(51) Int. Cl.[7] ........................................................ G06F 17/30
(52) U.S. Cl. ................................................................ 707/100
(58) Field of Search ................................. 707/1, 2, 3, 4, 707/5, 100, 101, 102, 103, 104

(56) References Cited

U.S. PATENT DOCUMENTS

| | | | |
|---|---|---|---|
| 3,916,387 | * 10/1975 | Woodrum | 707/3 |
| 4,086,628 | * 4/1978 | Woodrum | 707/7 |
| 5,067,166 | * 11/1991 | Ito | 382/215 |
| 5,263,124 | * 11/1993 | Weaver et al. | 382/159 |
| 5,608,898 | * 3/1997 | Turpin et al. | 707/201 |

* cited by examiner

Primary Examiner—Jack Choules
(74) Attorney, Agent, or Firm—Jospeh B. Taphorn

(57) ABSTRACT

Arrangement of fields in binary tree nodes provides a minimal storage encoding storing fixed and variable length keys in factored form in a multilevel tree. A locating method, and apparatus embodying that method, directed by an argument key, which may or may not be stored in the tree, traces a path following arcs upward or downward between nodes in said binary tree, starting from the top node or any other node, until it finds either the argument key or the delta arc where said argument key would be inserted into said tree. The novel binary tree encoding also provides for path tracing starting at a data backpointer field, which allows accessing of neighboring data entries in collating sequence order.

5 Claims, 5 Drawing Sheets

BINARY TREE STRUCTURE WITH END OF PATH FLAGS STORED WITH PATH ARC'S

This patent application is a division of patent application Ser. No. 07/970,399 filed Nov. 2, 1992 now U.S. Pat. No. 5,628,002 by the same inventor.

TABLE OF CONTENTS

Table of Contents
Introduction
Background of the Invention
Prior Art
Summary of the Invention
Claims
Abstract
Drawings

BACKGROUND OF THE INVENTION

1. Field of the Invention

This invention relates to a binary tree arrangement storing fixed or variable length keys, and a method and apparatus for locating the insert arc or node in such an arrangement.

2. Introduction

The invention provides a novel binary tree arrangement for a machine representation storing both fixed and variable length keys, together with their lengths, organized by the nodes and connections between nodes in said binary tree. The arrangement minimizes the storage required for the machine representation of said nodes, connections, keys and their lengths.

The invention provides method and means for controlling the locating step(s) of a binary tree insertion operation, It uses a principle based on a minimal difference or a maximal similarity relationship among the keys stored in the tree.

The embodiments of this invention include unique methods and apparatus for controlling the execution of a computer. This application describes the steps performed and the machine representation in sufficient detail that a person skilled in the art can make and use them in hardware, microprogram, or program. Thus the inventions can be utilized in either a special purpose or general purpose computer system.

The invention provides the control logic for said insertion method in a binary tree having said novel binary tree arrangement, said control logic minimizing the number of storage accesses and stores for carrying out said locating step(s) and inserting operation, and minimizing the amount of elapsed time required for a machine to execute said operations.

The invention provides both method and means for said control logic that is especially suited for direct use in a special purpose apparatus for executing the subject processes, and especially suited for incorporation in a reduced instruction set computer (RISC) in the form of instructions which can be executed in a single cycle.

The methods and apparatus of the invention provide economic advantage for sorting and indexing, which are heavily used in commercial computing environments; especially providing a competitive economic advantage for computer execution of database operations and associative classes in object oriented programming, logic programming, and constraint logic programming.

3. Description of the Prior Art

The prior art includes publications such as "Sorting and Searching", by D. E. Knuth, published in 1973 by Addison Wesley. The prior art also includes the following U.S. patents: U.S. Pat. No. 3,916,387 "Direcory Searching Method and Means", and U.S. Pat. No. 4,086,628 "Directory Generation System Having Efficiency Increase with Sorted Input."

The above prior art apply to searching and inserting in binary trees, where a forward path trace is followed by a backward path trace to complete an insert. The path trace utilizing the forward and backward path trace to locate the insert arc enables the prior art to locate the insert arc by processing a number of nodes approximately equal to 1.4 times the base two logarithm of the number of keys in the tree, plus the nodes on the backward path trace.

The prior art includes "Blasting Through The Information Theoretic Barrier With FUSION TREES", by Michael L. Frednam and Dan E. Willard, published in the Proceedings of the 22-nd ACM Symposium on Theory for Computing, (1990), pp. 1–7. In this prior art, multiplication is used to select bits of a key in order to form an index into a complete binary tree having a number for entries that is an exact power of two.

This prior art utilizes an insertion method requiring polynomial time for new nodes in a multiway tree. As a result, claims for faster sorting in this prior art apply only to ernormously large numbers of entries, as the "constant" time to use for each sub-logarithmic operation is so huge that it would require having trillions of entries before the time is competitive with other art.

More closely related prior art is "New Trie Data Structures Support Very Fast Search Operations", by Dan E. Willard, published in the Journal of Computing and System Sciences, volume 28, in 1984, pp. 379–394. In this prior art, two keys are stored at each binary tree node. Searching and inserting follow a downward path trace, starting from a top node. Said two keys are selected from the left and right subtrees, respectively, of said binary tree node. Said downward path trace proceeds by forming two quantities by exclusive-oring a new key with said two stored keys, and then comparing the two quantities. The lower of the two quantities determines whether the new key directs the downward path trace into said left or said right subtree of said node.

Also stored at each binary tree node are pointers to the subtrees of said node. Thus the space requirements are at least four words per entry, and in practice are more, because of the encoding of terminal nodes. No means nor method for backtrace is provided.

The above prior art mentions forming a multilevel tree structure by utilizing trees for each level, wherein the keys are restricted to the word length of the machine. The first level is thus represented by a first level tree. At the end of each path in the first level tree is a pointer to a next level tree for the next word in the key, and so on. No encoding methods, no arrangements of the fields to accomplish the multilevel encoding, are disclosed.

The above prior art does not provide for variable length keys, except for U.S. Pat. No. 3,916,387 which does not elaborate the actual representation for variable length key support.

In the prior art U.S. Pat. No. 3,916,387 no part of any key is stored in the tree, but all locating is done by means of bit testing. It is somewhat similar to the Fusion Tree methods, except that the Fusion Tree methods espouse the use of multiplcation for decoding multiple bits for path tracing.

SUMMARY OF THE INVENTION

Accordingly, it is an object of the invention to provide a faster means and method for locating the insert arc in a binary tree.

Another object of the invention is to provide a binary tree arrangement and insertion method and apparatus that is simpler and easier to use.

The subject invention locates the insertion arc by processing a number of nodes which could actually be less than the base two logarithm of the number of tree entries. It locates the insert arc on a forward path trace, stopping when it first processes the insert arc. Thus is does not necessarily trace the complete forward path; nor does it effect a backward trace.

In case the lengths of the paths in the binary tree are not evenly distributed, the above prior art locates an insertion arc in a number of steps equal to the length of the path to an already-existing entry plus the number of arcs traced along the backpath, whereas the subject invention never requires more steps to locate an insertion point than the length of the path, and on the average requires fewer steps than the length of an already existing path.

Another advantage of the invention over the prior art is that said prior art uses a flag bit as a part of each binary tree node representation to signal whether the node is a left or a right successor of its predecessor node, whereas the subject invention does not need nor use a left/right successor flag bit.

Yet another advantage of the subject invention over the above prior art is that the above prior art employs bit tests for path tracing, whereas the subject invention does not use bit testing for path tracing but rather uses a novel minimal difference or maximal similarity partitioning operation for path tracing during insertion.

The subject invention also has economic advantage over the prior art for building indexes and for sorting.

Partial order trees are also sometimes called "heap trees", after Floyd Patterson; see the "Communications of the ACM", 1965. The prior art employing partial order trees, or heap trees, require a number of steps proportional to the base two logarithm of the number of records being sorted, and require one memory fetch for each step, and on the average require one store into memory for every 2 steps.

Thus partial order sorting methods require approximately a total number of memory fetches or stores of 1.5 times the base two logarithm of the number of records, with ⅓ of the memory interactions being stores. The subject invention requires approximately the same number of memory interactions, but of the memory interactions only either 2 or 3 of them are stores into memory. Since random access memory performs stores slower than fetches from memory, the subject invention method has another advantage over the prior art.

A typical example is as follows: For 30,000 keys, a typical average binary tree path length ranges from 15 nodes to 23 nodes. A partial order tree sorting method would require 15 memory fetches, and an average of 8 stores to process #1 key through the sorting tree. The subject invention would have an average of approximately 19 memory fetches, and from 2 to 3 stores. Thus the total number of memory operations is slightly less than that for a partial order tree method (21 or 22 versus 23), and 2 or 3 stores versus 8 stores for the partial order tree.

Another advantage of the invention over the prior art is that the novel apparatus for the locating step enables a general purpose computer to execute in one instruction the same work as 14 to 17 instructions in a computer that does not have the novel apparatus, and, furthermore, the novel apparatus enables the single instruction to execute in one machine cycle, thereby providing a speedup that is estimated to be between two and five times.

Another advantage of the invention over the prior art is that the novel apparatus enabling the work to be done in 1 machine cycle allows the instruction to be included in a Reduced Instruction Set Computer (RISC) machine, wherein all instructions are required to execute in one cycle, thereby providing the machine with an order of magnitude speedup of the essential work done for sorting applications and indexing applications. Since sorting and indexing account for 15 to 25% of all commercial computer applications, the subject invention confers a significant economic advantage to sorting and indexing.

Another key feature of the subject invention is that it may be used to operate upon tree nodes containing portions of keys limited to the maximum size of a word for a given architecture.

DETAILED DESCRIPTION OF THE EMBODIMENTS OF THE INVENTION

Binary Tree Mapping

Figure 1:
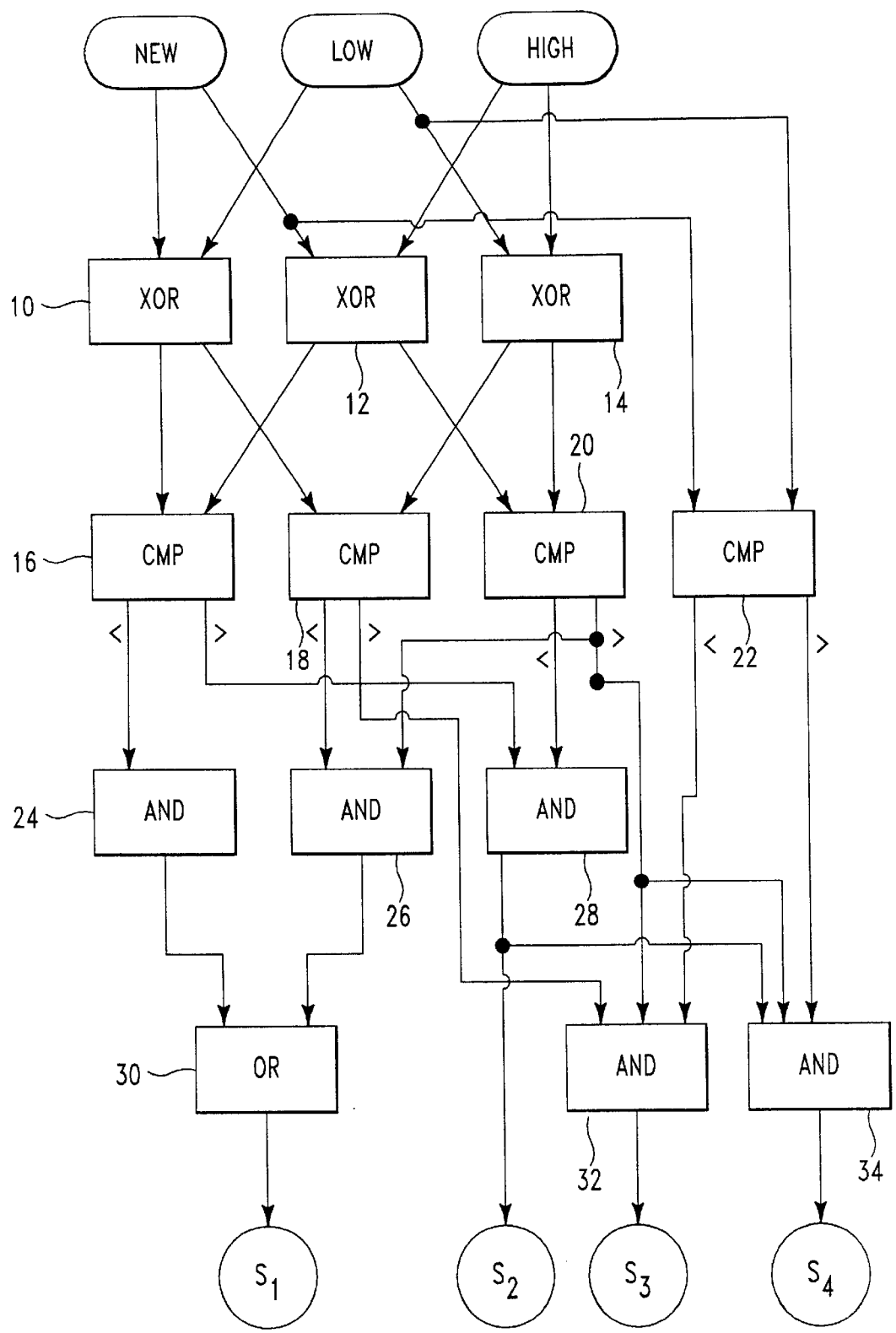
FIG. 1 is a diagram of one embodiment of the logic for carrying out the invention in hardware or software.

Each node N of the binary tree consists of two arc pointer fields, and a key field. The two arc fields represent the connections between said node and its predecessor and successors. Following the terminology of U.S. Pat. No. 3,916,387, the arc fields may be of the absolute, offset, or invertible type.

The key field, k, is a fixed or variable length field, and contains the key that is the smallest key associated with any of the entries in the right subtree of said node N.

Each node, except for the top node in the tree, has a left and a right subtree, which are accessed by using the left and right arc fields respectively of said node.

When there is only one entry in a subtree, the pointer has the value of the data pointer associated with the single key.

The top node only has a right arc field, and therefore has only a right subtree, and no left subtree. The key stored at the top node is the smallest key that is stored in the tree.

Note that the above description may be replaced by an equivalent description, where the key stored at a node is the largest key stored in the left subtree of said node, and then the top node would only have a left subtree, and no right subtree.

Since the left arc field for the top node is never used, since there is only a right arc from said top node, said top left arc field is used to point upward to a prior level of index tree. The top left arc field is called the B field, or backward pointer field.

The f01 flag bit in the B field is a one if the right successor of the top node is an inner node, i.e. it has two successors, or the f01 flag bit in the B field is a zero if the right successor of the top node is an end of path node.

The f10 bit in the B field is a one if the end of path arc that points to the top node from a prior level is a right arc, or the f10 bit in the B field is a zero if the end of path arc that points to the top node from a prior level is a left arc.

This use of the B field makes it possible to trace both upward and downward across levels.

The connections, or arcs, between binary tree nodes are represented by only two fields, using subtraction invertible fields to represent the three connections between any node and its three neighbors, as described in U.S. Pat. No. 3,916,387. Three fields may be used, but the use of two fields is believed to be the best mode for the invention.

Given the above description, a typical binary tree node from the tree would be as shown in the following table A:

TABLE A

Binary Tree Node Format

| Left Arc Field | | Right Arc Field | | Key field(s) |
|---|---|---|---|---|
| Low arc pointer to subtree of low keys | Left arc flag bits f10 f01 | High arc pointer to subtree of high keys | Right arc flag bits f10 f01 | Key field (may be variable length) |
| Flag bits for the left and right successors of the left successor of this node. | | Flag bits for the left and right successors of the right successor of this node. | | |

For example, in table B, which follows, z is at the end of the path (eop) if the left arc field at x is ANDed with the left successor flag bit mask f10 is non-zero.

q is at the end of the path (eop) if the left arc field at x is ANDed with the left successor flag bit mask f10 is non-zero.

The left arc field, stored at node y in table B, is equal to the address of the left successor of node y, node z, minus the address of node x.

The right arc field, stored at node y in table B, is equal to the address of the right successor of node y, node q, minus the address of node x.

We may represent this relationship by the equations

"$z = x + \text{left\_arc\_field}(y)$", and "$q = x + \text{right\_arc\_field}(y)$".

Given a node x and a node y, the above line enables us to compute the address of either the left or right successor node of y.

Also, solving the above for x, we find that $x = z - \text{left\_arc\_field}(y)$, and $x = q - \text{right\_arc\_field}(y)$.

Thus, given node y and either of its two successors, z or q, we can compute x using the appropriate relationship.

Another significant reason for using subtraction fields is that the resulting data structure is completely relocatable, and the connection fields are independent of any base pointers or pointer registers used to access the entries. This not only applies to invertible fields, but also to non-invertible fields, such as the backward pointer field B.

The combination of these enables the entire data structure to be traced from any given pair of nodes, or from a single node with a backward field, to any other node in the entire structure without the use of a stack or other temporary work area except for the use of three registers, two of which hold two node pointers, and the other register is used as a temporary for computing predecessors and successors.

TABLE B

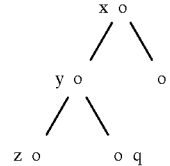

Flag Bit Mapping for Flag bits stored in Predecessor's Arc Fields.

FIG. 1 diagrammatically depicts the generation of four output signals, providing a grouping of a new key or word with a low key or word, a grouping of said new key with a high key or word, a grouping of said low key with said high key with said new key being smaller than said low key, and a grouping of said low key and said high key with said new key being higher than said high key, respectively.

The low key is interpreted as a key from a low, or left, subtree of a selected node, and the high key is interpreted as a key from a high, or right subtree, of the selected node.

The minimal difference compare mechanism in FIG. 1 can be used for a downward path trace locating step, locating an arc for subsequent insertion, or for an upward or downward path trace locating step. The output signals testing a given key against a given node are obtained by first feeding or gating the signals representing the new key into exculsive-or circuits 10 and 12, respectively the low and high key signals of the node. A third exclusive-or circuit 14 receives the low and high key signals.

Signals from the exclusive-or circuits are received by three of a bank of four compare circuits. Thus signals from exclusive-or circuits 10 and 12 are received by compare circuit 16; from exclusive-or circuits 10 and 14 by compare circuit 18; from exclusive-or circuits 12 and 14 by compare circuit 20. A fourth compare circuit 22 receives the signals representing the new key and the low node key.

From the compare circuits, the signals are sent on to AND circuits. A first bank of AND circuits receives the exclusive-or input compare circuits according to whether the new key compared low or high with the low and high keys of the node. Of these, AND circuit 24 receives a signal from compare circuit 16 when the product of exclusive-or circuit 10 is less than that of 12. And circuit 24 receives a signal from compare circuit 18 when the product of exclusive-or circuit 10 is less than that of 14, and from compare circuit 20 when the product of exclusive-or circuit 14 is greater than that of 12.

AND circuit 28 receives a signal from compare circuit 16 when the product of exclusive-or circuit 10 is greater than that of 12, and from compare circuit 20 when the product of exclusive-or circuit 12 is less than that of 14.

The first bank of AND circuits, 24 26, and 28 sends signals on to an OR circuit 30 and a second bank of AND circuits 32 and 34. The OR circuit 30 receives signals from AND circuits 24 and 26 and will provide an output signal S1 when either passes a signal. Signal S1 indicates that the new key is associated with keys like the node low key and that nodes in the low subtree should be processed. And circuit 28 directly provides an output signal S2. Signal S2 indicates that the new key is associated with keys like the high key and that nodes in the high subtree should be processed.

AND circuit 32 receives a signal from compare circuit 18 when the product of exclusive-or circuit 10 is greater than that of 14, from compare circuit 20 when the product of exclusive-or circuit 12 is greater than that of 14, and from compare circuit 22 when the new key is greater than the node low key.

AND circuit 32 then produces the output signal S3. Signal S3 indicates that the new key is numerically smaller than the node low key and numerically smaller than the node high key and the insertion arc or point is determined.

AND circuit 34 receives a signal from AND circuit 28, a signal from compare circuit 20 when the product of exclusive-or circuit 12 is greater than that of 14, and from compare circuit 22 when the new key is greater than the node low key.

On the appearance of these three signals, it generates output signal S4. Signal S4 indicates that the insert arc as a high successor has been found and the new key is numerically higher that both the node low key and the node high key.

Figure 2:
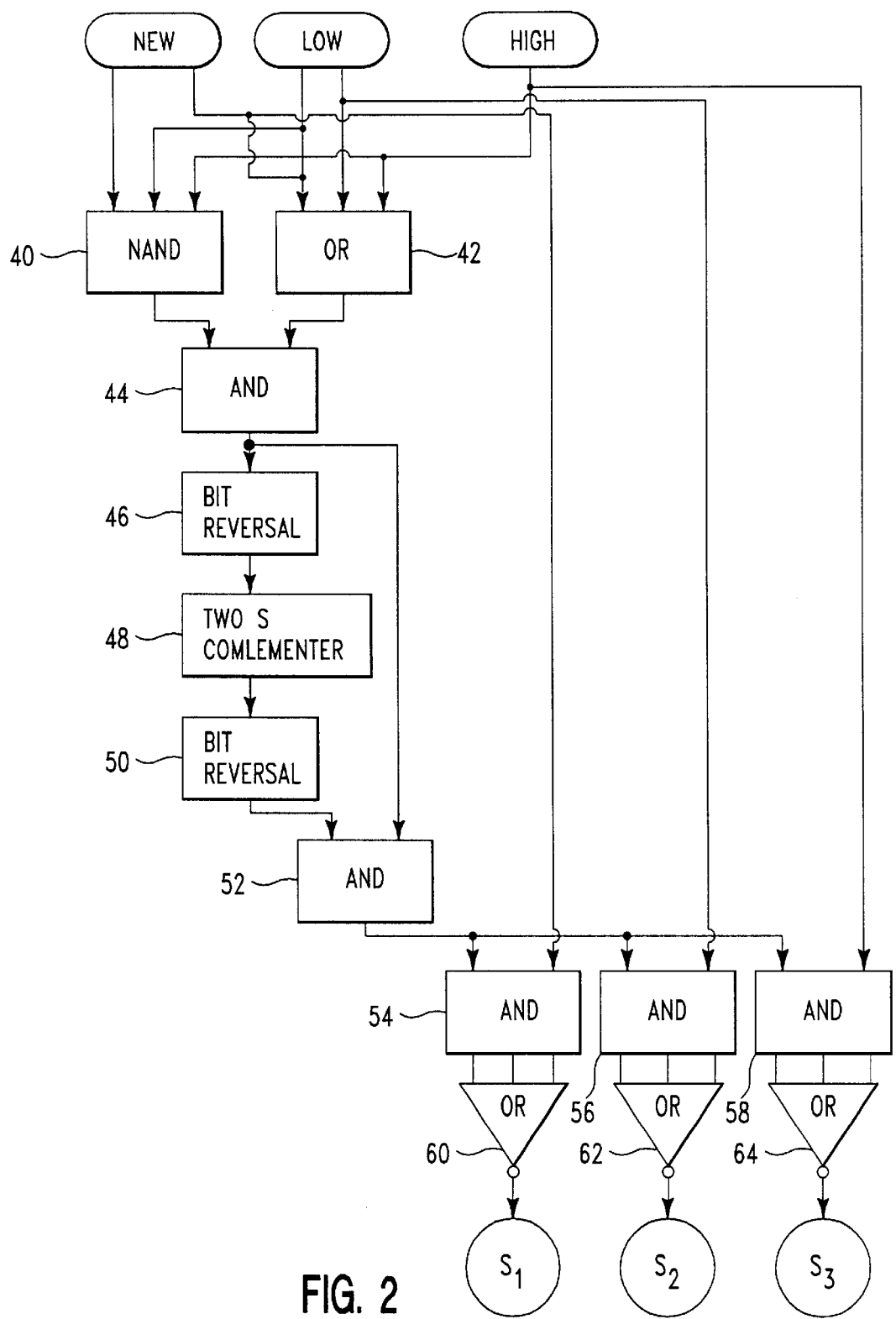
FIG. 2 is a diagram of another embodiment of the logic for carrying out the invention in hardware or software.

FIG. 2 depicts a modified embodiment involving a three-way compare, where three output signals are provided. The mechanism computes a mask which identifies a highest order bit position where the three respective bits of said new key or word, said low key or word, and said high key or word are not all equal. Said mask then selects said bit from each of the three keys, and provides three output signals, each output signal having the value of the bit selected by said mask in said new key, said low key, and said high key.

In this embodiment, the output signals from testing a new key against a given node are obtained by first feeding or gating the signals representing the new key and the low and high keys of the node into a NAND circuit or logic mechanism 40, and an OR circuit or logic mechanism 42. The output signal of the NAND circuit 40 and the OR circuit 42 are exactly as wide as the keys or key words and are fed to a first AND circuit or logic mechanism 44.

The output signal of the AND circuit or logic mechanism 44 is also the same width as a key or key word, and is fed to a bit reversal circuit or logic mechanism 46 which functions to provide an output signal with the bits in its input signal reversed from low order to high order. The output signal from complementer circuit or logic mechanism 48 which functions to provide an output signal that is the twos complement of its input signal. The output signal of the twos complementer circuit or logic mechanism 48 is fed to a second bit reversal circuit or logic mechanism 50.

A second AND circuit or logic mechanism 52 receives the output signal of the bit reversal circuit or logic mechanism 50 and the output signal of the first AND circuit 44. The output signal of the AND circuit 52 is fed to each of a bank of three AND circuit or logic mechanisms; third AND circuit 54, fourth AND circuit 56, and fifth AND circuit 58. The new key signal also is fed to the third AND circuit 54; the node low key to the fourth AND circuit 56; and the node high key signal to the fifth AND circuit 58.

The NAND circuit or logic mechanism 40, the OR circuit 42, the AND circuit 44, the first bit reversal circuit 46, the twos complementer circuit or logic mechanism 50 and the AND circuit 52 as connected compute the mask which identifies the highest order bit position of the new key and the node low key and the node high key that are not all equal. The mask then enables selecting the bit in the corresponding bit position from each of the keys through the bank of AND circuits 54, 56, and 58.

Each output of each of the AND circuits 54, 56, and 58 is the same bit width as a key or key word, and will have only zero bits in positions other than the position of the first bit of inequality of the three keys, and will have the the three bits in the position of inequality from each of the three keys, the new key, the node low key, and the node high key, respectively.

Three funnel OR circuit or logic mechanisms 60, 62, and 64 sum up the outputs of the respective AND circuit or logic mechanisms 54, 56, and 58, which are one key or key word wide. Their outputs S1, S2, and S3, are zero if the bit position selected by the mask of the key inputted into the corresponding AND circuit is zero, and one if it is a one.

The significance of the output signals S1, S2, and S3 are set forth in the following table C. The computing system embodying the invention then takes action accordingly. The three output bits are interpreted as follows.

TABLE C

| NEW key bit | LOW key bit | HIGH key bit | Significance |
| --- | --- | --- | --- |
| 0<br>or<br>1 | 0<br><br>1 | 0<br><br>1 | All three keys are equal, there being no bit position where a combination other than 0 0 0 or 1 1 1 appears. |
| 0 | 0 | 1 | NEW key is grouped together with LOW key, and the subtree containing said NEW and LOW keys is on the path to the delta arc. |
| 0 | 1 | 0 | NEW key is grouped together with HIGH key, and said LOW key is greater than said HIGH key. This output signals an error. |
| 0 | 1 | 1 | LOW key is grouped together with HIGH key, and first node on the path to the delta arc is the predecessor of said selected node. Also NEW key is smaller than either said low key or said high key. |
| 1 | 0 | 0 | LOW key is grouped together with HIGH key, and first node on the path to the delta arc is the predecessor of said selected node. Also NEW key is higher than either said low key or said high key. |
| 1 | 0 | 1 | NEW key is grouped together with HIGH key, and the subtree containing said LOW and said HIGH keys is on the path to the delta arc. |
| 1 | 1 | 0 | NEW key is grouped together with said LOW key, and said LOW key is numerically greater than said HIGH key. This output signals an error. |

Conservation of Flag Bits

Cases may arise where all of the bits in an arc pointer field may be required by the underlying architecture for addressing. In this case, it is desirable to use some of the bits in the key field for storing flag bits, but also to not compromise any of the fully stored key values.

This is accomplished by using a top decoding node, which decodes some of the high order bits of the stored keys (a prefix of the stored keys.) This decoding is then represented by a plurality of arc pointer fields at the top decoding node, each of which points to a binary tree containing only keys beginning with the decoded key prefix. For example, in order to use this method to decode one key prefix bit, two arc pointer fields are required at the top decoding node.

All keys having a zero high order bit are stored in the binary tree addressed by the first arc pointer field, and all keys having a high order bit equal to one are stored in the binary tree addressed by the second arc pointer field.

Then the keys in the binary tree addressed by the first arc pointer field all have the high order stored bit equal to zero, and all of the keys stored in the binary tree addressed by the second arc pointer field have the high order bit equal to one.

Figure 3:
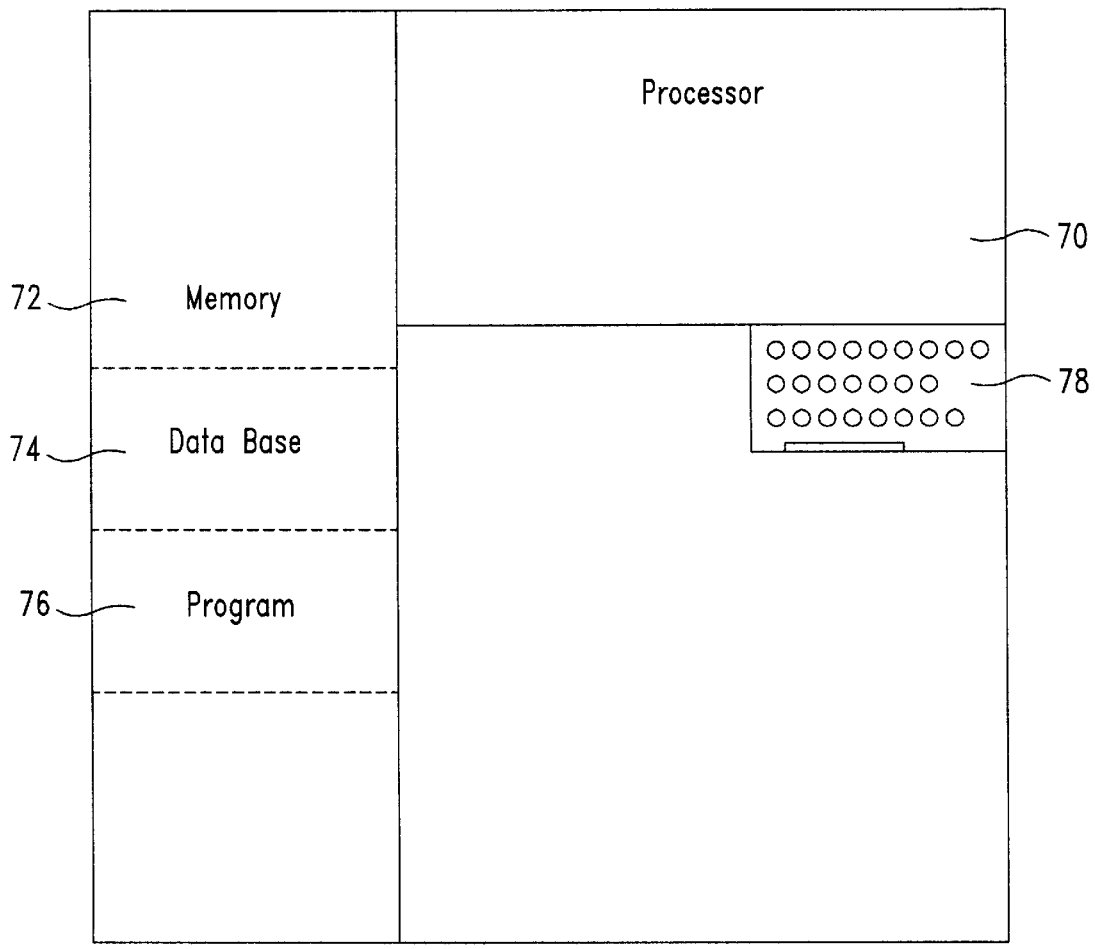
FIG. 3 is a diagram of a system embodying the invention.
Figure 4:
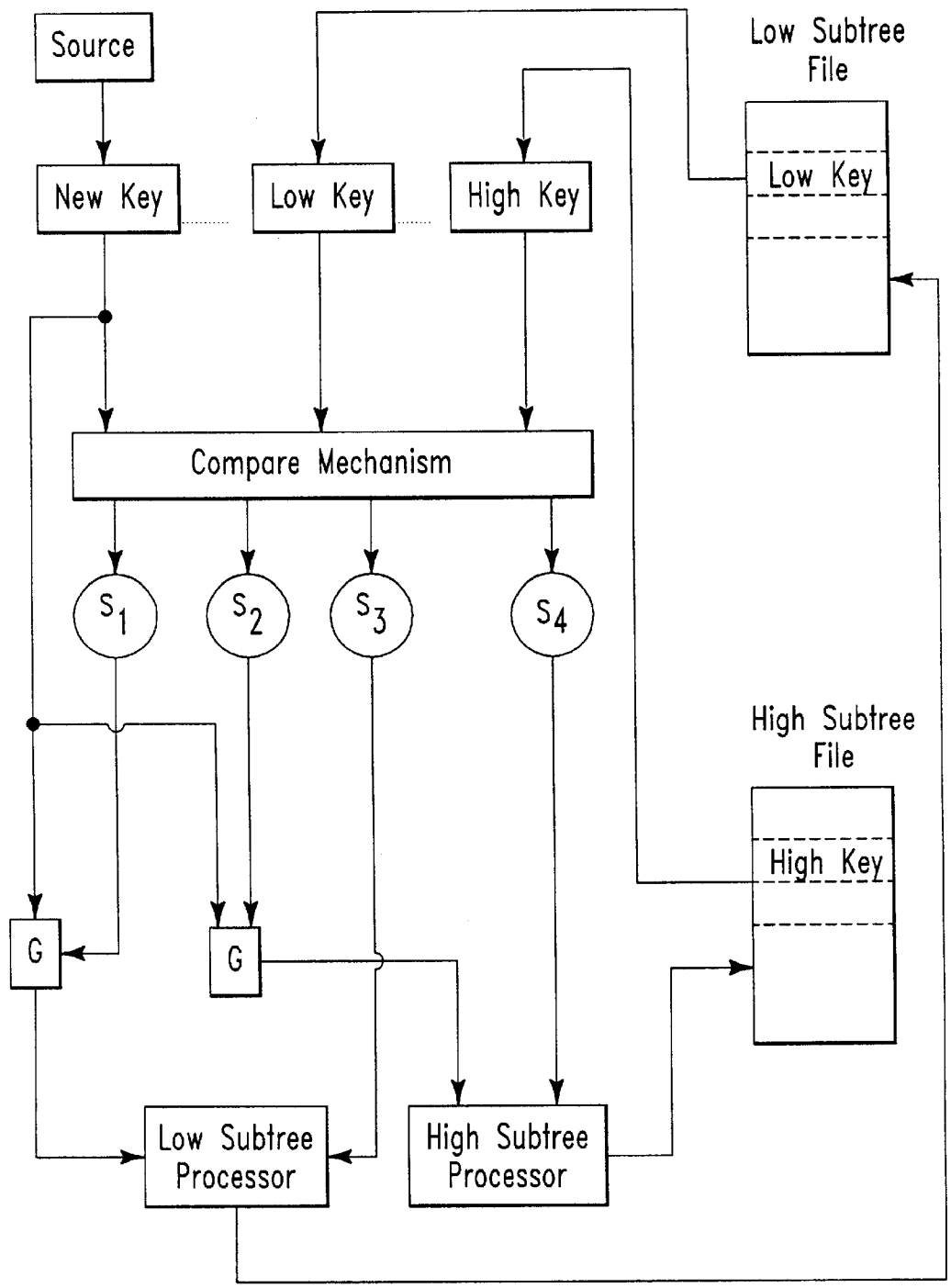
FIG. 4 is a diagrammatic view of a system for sorting three keys into two sets.
Figure 5:
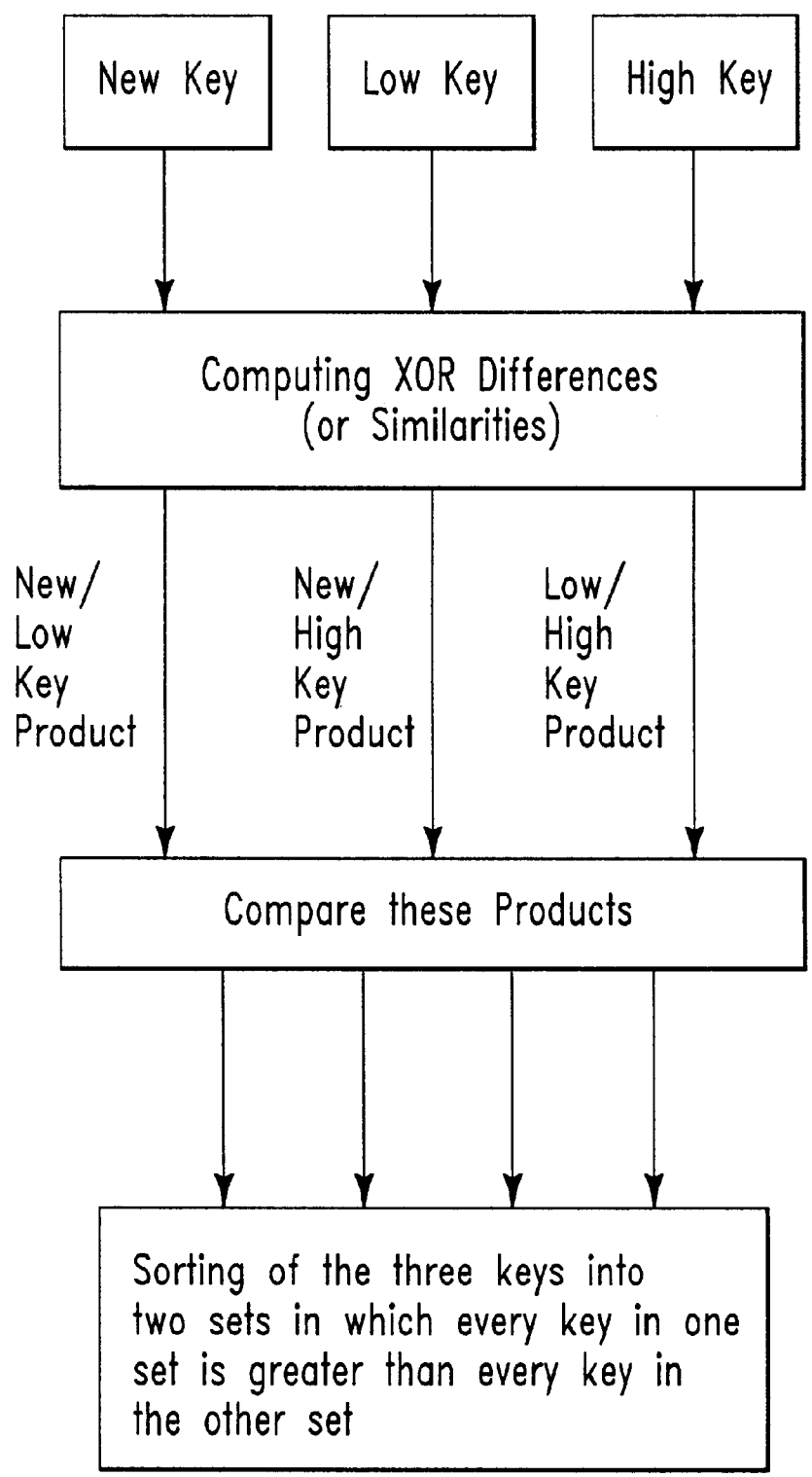
FIG. 5 is a flow chart of a method for sorting three keys into two sets.

FIG. 3 diagrammatically shows different parts of a system embodying the invention. Included are a processor 70, a memory 72 has subarea 74 in which the data base is stored, and subarea 76 in which the program for carrying out the invention is stored and its table, and a keyboard 78 for entering new data. The program guides the processor to update the data base and the table in memory.

Embodiment in C-Language Program

An embodiment of the invention in a program written in the "C" language is set forth in U.S. Pat. No. 5,628,002 which is incorporated herein by reference.

What is claimed is:

1. A novel arrangement of flag bits signalling whether successors of an inner node, which itself is not at the end of a path, are at the end of a path, wherein said inner node has two successors, each of which may be an end of path node, independently of each other, two flag bits recording the end of path status of said two successors of said inner node, said flag bits arranged in a novel arrangement by being stored in the low order two bits of one of the inner arc fields of the predecessor of said inner node, said arc field of said predecessor node being a left inner arc field if said inner node is a left successor of said predecessor node, or said arc field of said predecessor node being a right inner arc field if said inner node is a right successor of said said predecessor node, said novel arrangement of flag bits thereby storing said end of path status of said successors of said inner node stored totally in said inner arc field of said predecessor of said inner node without any end of path information being stored in an arc of said inner node that is an end of path arc, thereby providing a complete word for storing end of path arcs containing no end of path flag bits.

2. An arrangement of end of path flag bits stored in inner arc fields as in claim 1, together with a novel grouping of flag bits in end of path arc fields in a binary tree representing a level in a multilevel index structure, wherein an end of path arc may point to a next level binary tree, or to a data area, or to both a next level binary tree and to a data area, said grouping of flag bits consisting of two flag bits in said end of path arc field, wherein one of said two flag bits, called the next level flag bit, records the presence or absence of a binary tree on a next level, and the other of said two flag bits, called the data pointer flag bit, records the presence or absence of a data pointer at said end of path arc, wherein when said data pointer flag bit is on and said next level flag bit is off said end of path arc provides an arc field from which a data pointer can be derived, wherein when said data pointer flag bit is off and said next level flag bit is on said end of path arc provides an arc field from which can be derived a pointer to a next level binary tree in a multilevel structure, wherein when both of said flag bits are on to indicate both a next level binary tree and a data pointer present then said end of path arc field provides an arc field from which can be derived a pointer to a top node of a binary tree on said next level having a data pointer also stored with said top node of said binary tree on said next level, said data pointer being stored in memory in a memory location adjacent to said top node of said binary tree on said next level for convenient access, said novel novel grouping of flag bits in end of path arc fields thereby providing an operational definition for entries in a multilevel index structure wherein paths are recorded in the multilevel index structure that can be prefixes of other paths in said multilevel structure, said paths thereby providing means for storing variable length keys in factored form in a multilevel index structure, and providing such means with minimal storage.

3. An arrangement of inner arc flag bits and end of path flag bits as in claim 2, wherein a previously unused combination of end of path arc flag bits denoting neither a next level nor a data pointer is used to signify an arc field pointing to a backward index pointer field, said backward index pointer field storing a connection back to the inner node at the end of path which points to said backward index pointer field, said backward index pointer field containing also a single flag bit recording whether said backward index pointer field is a left or a right successor of said inner index node, said backward index pointer field thereby providing a means of accessing adjacent index entries in collating sequence starting from said backward index pointer, and not needing to begin at the top of said index a trace an entire path to the bottom, said backward index pointer also allowing extraction of the key associated with the index entry starting with said backward index pointer.

4. An arrangement such as that in claim 3, together with a backward field at each top node of a binary tree, said backward field containing an arc pointing at the predecessor of said top node on the prior level, and containing a flag bit denoting whether said top node is a left or a right successor of said predecessor of said top node on said prior level, said backward field being stored in the left arc field of said top node, since top nodes do not have left successors, said backward field also containing a flag bit denoting whether the successor of said top node is an end of path node or another inner node, thereby providing the capability for the top node to have a right end of path arc, and also providing for a multilevel index structure that is arbitrarily traceable starting from any node, and providing access to any other node, without need of stacks, recursion, nor any other temporary storage other than a pair of registers to hold a selected connected pair of nodes, said selected pair of nodes capable of being any connected pair of nodes in the entire multilevel index structure.

5. An arrangement of binary tree entries in a multilevel index structure and flag bits as in claim 4, together with two operations for inserting and deleting entries, said inserting and deleting operations preserving all specified relationships and meanings of flag bits as indicated, said inserting and deleting operations also recomputing said backward index pointer field flag bit whenever said predecessor of said backward index pointer changes from being a left successor to being a right successor or vice versa by virtue of said inserting or deleting operations, thereby providing inserting and deleting operations maintaining the validity of said backward index pointer fields.

* * * * *